United States Patent
Kim et al.

(10) Patent No.: US 11,754,822 B2
(45) Date of Patent: Sep. 12, 2023

(54) OPTICAL IMAGING SYSTEM

(71) Applicant: Samsung Electro-Mechanics Co., Ltd., Suwon-si (KR)

(72) Inventors: Hag Chul Kim, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 61 days.

(21) Appl. No.: 16/299,208

(22) Filed: Mar. 12, 2019

(65) Prior Publication Data
US 2020/0041773 A1    Feb. 6, 2020

(30) Foreign Application Priority Data

Aug. 1, 2018 (KR) .................. 10-2018-0089913
Sep. 28, 2018 (KR) .................. 10-2018-0115989

(51) Int. Cl.
*G02B 17/00* (2006.01)
*G02B 17/08* (2006.01)
*G02B 13/00* (2006.01)

(52) U.S. Cl.
CPC ....... *G02B 17/0856* (2013.01); *G02B 13/004* (2013.01)

(58) Field of Classification Search
CPC .. G02B 13/004; G02B 13/18; G02B 17/0856; G02B 17/0808
USPC ................. 359/366, 729, 731, 859
See application file for complete search history.

(56) References Cited

U.S. PATENT DOCUMENTS

| | | | | |
|---|---|---|---|---|
| 3,507,556 A | * | 4/1970 | Yoshiyuki | G02B 17/0884 359/731 |
| 4,188,091 A | * | 2/1980 | Fujii | G02B 17/0808 359/731 |
| 4,264,136 A | * | 4/1981 | Ogino | G02B 17/0808 359/731 |
| 4,273,425 A | * | 6/1981 | Canzek | G02B 17/0808 359/731 |
| 6,842,298 B1 | * | 1/2005 | Shafer | G02B 13/143 359/365 |
| 8,965,193 B1 | | 2/2015 | Svec et al. | |
| 2002/0024741 A1 | * | 2/2002 | Terasawa | G02B 17/0892 359/627 |
| 2013/0010180 A1 | * | 1/2013 | Hatakeyama | G02B 27/646 348/360 |

(Continued)

FOREIGN PATENT DOCUMENTS

| | | | | |
|---|---|---|---|---|
| CN | 107436485 A | * | 12/2017 | ......... G02B 13/0035 |
| JP | 2002-277741 A | | 9/2002 | |
| JP | 2004-212639 A | | 7/2004 | |

(Continued)

OTHER PUBLICATIONS

Chinese Office Action dated Jun. 15, 2022 in corresponding Chinese Patent Application No. 201910349250.9 (6 pages in English, 8 pages in Chinese).

*Primary Examiner* — Mahidere S Sahle
(74) *Attorney, Agent, or Firm* — NSIP Law (57) ABSTRACT

An optical imaging system includes a first lens having refractive power, a second lens including a first reflective region formed on an object-side surface of the second lens, a third lens having a second reflective region formed on an image-side surface of the third lens, and a fourth lens having refractive power.

21 Claims, 6 Drawing Sheets

(56) References Cited

U.S. PATENT DOCUMENTS

2017/0146776 A1   5/2017   Kang et al.
2018/0106989 A1   4/2018   Kono et al.

FOREIGN PATENT DOCUMENTS

| JP | 2018-109673 A | 7/2018 | |
|---|---|---|---|
| KR | 10-2017-0059244 A | 5/2017 | |
| KR | 10-2017-0066460 A | 6/2017 | |
| TW | 201826037 A | 7/2018 | |
| WO | WO 2017/039713 A1 | 3/2017 | |
| WO | WO-2018066313 A1 * | 4/2018 | ......... G02B 17/0808 |

* cited by examiner

OPTICAL IMAGING SYSTEM

CROSS-REFERENCE TO RELATED APPLICATIONS

This application claims the benefit under 35 USC 119(a) of Korean Patent Application No. 10-2018-0089913 filed on Aug. 1, 2018, and Korean Patent Application No. 10-2018-0115989 filed on Sep. 28, 2018, in the Korean Intellectual Property Office, the entire disclosures of which are incorporated herein by reference for all purposes.

BACKGROUND

1. Field

This application relates to an optical imaging system capable of imaging a subject at long distance.

2. Description of the Background

Small-sized optical imaging systems mounted in portable terminal devices are generally optimized to image a subject at short range. Thus, it may be difficult for such small-sized optical imaging systems to image a subject at long range. There are small-sized optical imaging systems optimized for imaging a subject at a long range, but due to a limited mounting space in a portable terminal device, it may be difficult to increase a telephoto ratio by twice or more.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having refractive power, a second lens having a first reflective region formed on an object-side surface of the second lens, a third lens comprising a second reflective region formed on an image-side surface of the third lens, and a fourth lens having refractive power.

The first reflective region may be disposed to include an optical axis of the second lens.

The second reflective region may be formed on a region other than an optical axis of the third lens.

The second reflective region may surround the optical axis and be spaced apart from the optical axis by a refractive region formed on the image-side surface of the third lens, and the refractive region may include the optical axis of the third lens.

The first lens may include a convex object-side surface.

The second lens may include a convex image-side surface.

The third lens may include a concave object-side surface.

The third lens may include a convex image-side surface.

The fourth lens may include a convex image-side surface.

The second lens may have an effective diameter smaller than effective diameters of the first lens and the third lens.

In another general aspect, an optical imaging system includes a first lens, a second lens, a third lens, and a fourth lens disposed in order from an object-side, wherein one or more of the first to fourth lenses comprise a reflective region reflecting light refracted from adjacent lenses, and wherein the optical imaging system satisfies a conditional expression: $1.1 \leq f/TL2$, where f is a focal length of the optical imaging system, and TL2 is a total optical length of the optical imaging system.

The second lens may have a reflective region formed on an object-side surface of the second lens.

The third lens may have a reflective region formed on an image-side surface of the third lens.

The first lens may have a convex object-side surface.

The optical imaging system may satisfy a conditional expression: $TL2/TL1 < 2.1$, where TL1 is a total lens length of the optical imaging system, and TL2 is a total optical length of the optical imaging system.

The optical imaging system may satisfy one or more conditional expressions: $0.1 < L1S1/f < 0.95$, $-0.95 < L2S1/f < -0.1$, $-1.5 < L3S1/f < -0.2$, $-1.55 < L3S2/f < -0.25$, where L1S1 is a radius of curvature of an object-side surface of the first lens, L2S1 is a radius of curvature of an object-side surface of the second lens, L3S1 is a radius of curvature of an object-side surface of the third lens, and L3S2 is a radius of curvature of an image-side surface of the third lens.

In another general aspect, an optical imaging system includes a first lens, a second lens, a third lens, and a fourth lens disposed in order from an object-side, wherein incident light from the object-side is refracted by the first lens, reflected by a reflective region of the third lens, reflected by a reflective surface of the second lens, refracted by a refractive region of the third lens, and refracted by the fourth lens to form an image in this order.

The reflective region of the third lens may be disposed on an image-side surface of the third lens and spaced apart from an optical axis of the third lens.

The refractive region of the third lens may include the optical axis on the image-side surface of the third lens.

The reflective region of the second lens may be disposed on an object-side surface of the second lens and may include an optical axis of the second lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

An aspect of the present disclosure is to provide an optical imaging system able to be mounted on a portable terminal device and capable of implementing a relatively high telephoto ratio.

In the embodiments, a first lens refers to a lens most adjacent to an object (or a subject), and a fourth lens refers to a lens most adjacent to an imaging plane (or an image sensor). Also, an entirety of a radius of curvature, a thickness, a distance from an object-side surface of a first lens to the imaging plane (TL1), a half diagonal length of the imaging plane (IMGHT), and a focal length of a lens are indicated in millimeters (mm). Further, a thickness of a lens, a gap between lenses, and TL1 are distances measured based on an optical axis of the lens. In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge region of the lens may be concave. In a similar manner, in a configuration in which a surface of a lens is described as being concave, an edge region of the lens may be convex.

In the embodiments, an optical imaging system may include four lenses disposed in order from an object side towards an imaging plane. For example, the optical imaging system may include a first lens, a second lens, a third lens, and a fourth lens disposed in order. The first to fourth lenses may be disposed with certain gaps. For instance, a certain gap may be formed between an image-side surface of the first lens and an object-side surface of the second lens.

The first lens may have refractive power. For example, the first lens may have positive refractive power or negative refractive power.

The first lens may have a concave surface. For example, the first lens may have a concave object-side surface. The first lens may have an aspherical surface. For example, the object-side surface and the image-side surface of the first lens may be aspherical. The first lens may be made of a material having high light transmissivity and excellent workability. For example, the first lens may be made of plastic. However, a material of the first lens is not limited to plastic. The first lens may be made of glass, for example.

The second lens may have refractive power. For example, the second lens may have positive refractive power or negative refractive power.

The second lens may have a concave surface. For example, the second lens may have a convex image-side surface. The second lens may have an aspherical surface. For example, the object-side surface and the image-side surface of the second lens may be aspherical. The second lens may be made of a material having high light transmissivity and excellent workability. For example, the second lens may be made of plastic. However, a material of the second lens is not limited to plastic. The second lens may be made of glass, for example.

The second lens may include a region reflecting light. For example, a region including an optical axis on the object-side surface of the second lens may be configured to reflect light incident from the image-side surface of the second lens to the third lens.

The third lens may have refractive power. For example, the third lens may have positive refractive power or negative refractive power.

The third lens may have a concave surface. For example, the third lens may have a concave object-side surface. The third lens may have a spherical surface or an aspherical surface. For example, one of the object-side surface and the image-side surface of the third lens may be aspherical, or both of the object-side surface and the image-side surface of the third lens may be spherical. The third lens may be made of a material having high light transmissivity and excellent workability. For example, the third lens may be made of plastic. However, a material of the third lens is not limited to plastic. The third lens may be made of glass, for example.

The third lens may include a region reflecting light. For example, a region other than an optical axis on the image-side surface of the third lens may be configured to reflect light incident from the first lens to the second lens. For example, the region reflecting light may be an edge portion of the image-side surface of the third lens. For example, the region reflecting light may be disposed in a peripheral region of the image-side surface of the third lens to surround the optical axis and be spaced apart from the optical axis by a region including the optical axis on the image-side surface of the third lens configured to refract light incident from the second lens to the fourth lens.

The fourth lens may have refractive power. For example, the fourth lens may have negative refractive power.

The fourth lens may have a concave surface. For example, the fourth lens may have a concave object-side surface. The fourth lens may have a spherical surface. For example, the object-side surface and the image-side surface of the fourth lens may be aspherical. The fourth lens may be made of a material having high light transmissivity and excellent workability. For example, the fourth lens may be made of plastic. However, a material of the fourth lens is not limited to plastic. The fourth lens may be made of glass, for example.

The first to fourth lenses may include aspherical surfaces as described above. The aspherical surfaces of the lenses may be represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ Equation 1

In Equation 1, c is an inverse of a radius of curvature of the respective lens, k is a conic constant, r is a distance from a certain point on an aspherical surface to an optical axis of the lens, A to J are aspherical constants, and Z (or sag) is a height from a certain point on an aspherical surface to an apex of the respective aspherical surface in an optical axis direction.

The optical imaging system may further include a stop. The stop may be disposed in a front region of the first lens.

The optical imaging system may further include a filter. The filter may block certain wavelengths of light incident through the first to fourth lenses. For example, the filter may block infrared wavelengths of incident light.

The optical imaging system may further include an image sensor. The image sensor may provide an imaging plane on which light refracted by the lenses may be imaged. For example, a surface of the image sensor may form the imaging plane. The image sensor may be configured to implement a high level of resolution. The imaging plane of the image sensor may have a certain size. For example, a diagonal length (IMGHT*2) of the imaging plane may be smaller than an effective diameter of the first lens or an effective diameter of the third lens, and may be greater than an effective diameter of the second lens.

The optical imaging system may be configured such that an optical path may be increased without increasing an overall length of the optical imaging system. For example, light refracted by the first lens may be reflected from an edge portion of the third lens and may be incident to the second lens. The light incident to the second lens may be reflected from an object-side surface of the second lens and may be incident to a paraxial region of the third lens. The light refracted in the paraxial region of the third lens may be refracted in the fourth lens and may be incident to the imaging plane.

The optical imaging system configured as above may increase a telephoto ratio four times without increasing the number of lenses or a distance between the lenses. Thus, the optical imaging system may effectively be applied to a portable terminal device in which a range of limitation in overall length of the optical imaging system is relatively large.

The optical imaging system may satisfy one of first to fourth conditional expressions below:

$0.1 < L1S1/f < 0.95$ (Conditional Expression 1)

$-0.95 < L2S1/f < -0.1$ (Conditional Expression 2)

$-1.5 < L3S1/f < -0.2$ (Conditional Expression 3)

$-1.55 < L3S2/f < -0.25$ (Conditional Expression 4)

Further, the optical imaging system may also satisfy one of fifth to seventh conditional expressions below:

$2.0 < f/TL1$ (Conditional Expression 5)

$1.1 \leq f/TL2$ (Conditional Expression 6)

$TL2/TL1 < 2.1$ (Conditional Expression 7)

In the conditional expressions above, "f" is a focal length of the optical imaging system, "L1S1" is a radius of curvature of an object-side surface of the first lens, "L2S1" is a radius of curvature of an object-side surface of the second lens, "L3S1" is a radius of curvature of an object-side surface of the third lens, "L3S2" is a radius of curvature of an image-side surface of the third lens, "TL1" is a total lens length (a distance from an object-side surface of the first lens to the imaging plane) of the optical imaging system, and "TL2" is a total optical length (a sum of lengths of light refracted and reflected between the object-side surface of the first lens and the imaging plane) of the optical imaging system.

In the description below, an optical imaging system will be described in accordance with one or more embodiments.

Figure 1:
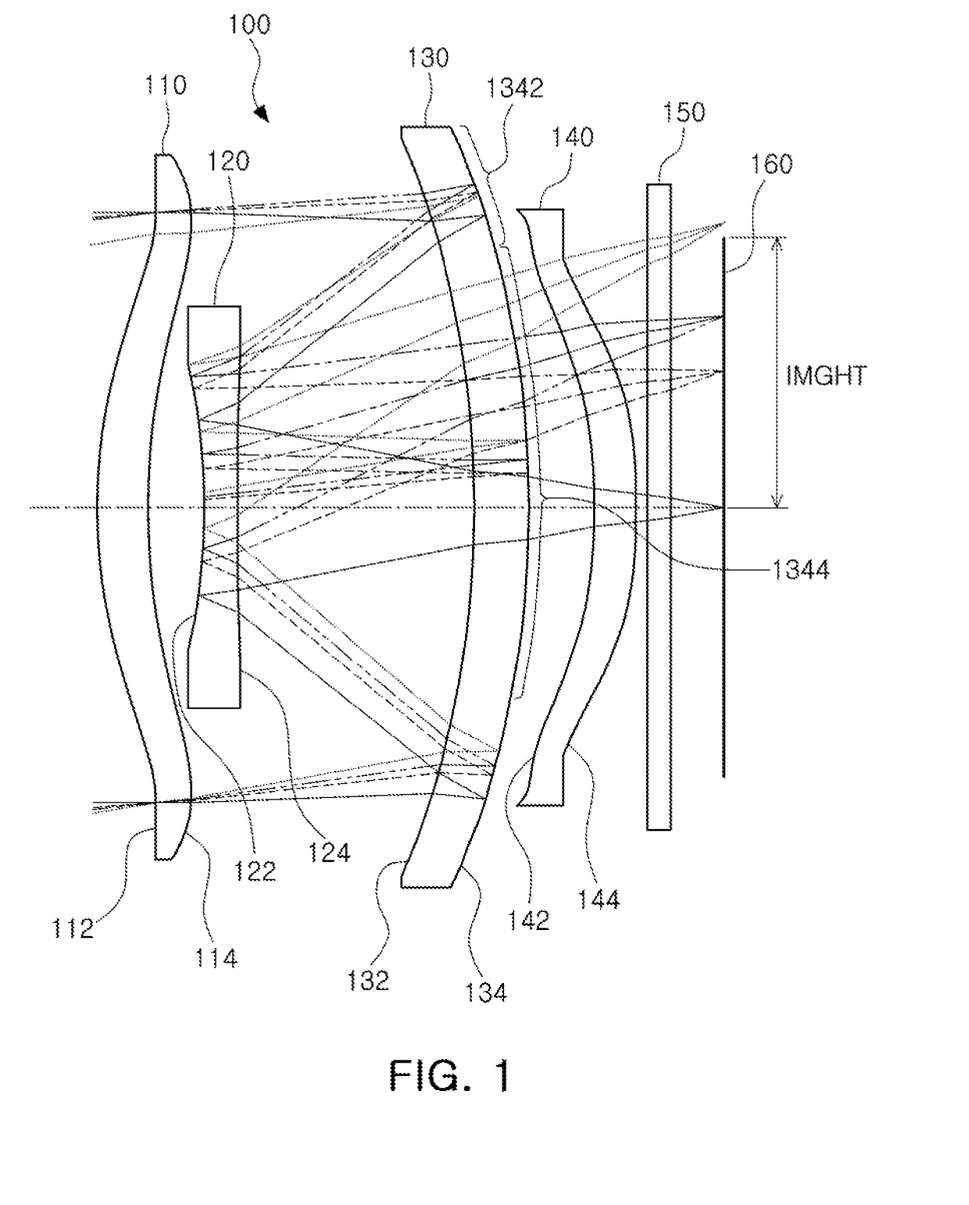
FIG. 1 is a diagram illustrating a first example of an optical imaging system.

A first example of an optical imaging system will be described with reference to FIG. 1.

An optical imaging system 100 may include a plurality of lenses having refractive power. For example, the optical imaging system 100 may include a first lens 110, a second lens 120, a third lens 130, and a fourth lens 140. The first to fourth lenses 110, 120, 130, and 140 may be disposed in order with gaps from an object side. Refraction and reflection of light, however, may not occur in the order of the first lens 110, the second lens 120, the third lens 130, and the fourth lens 140. For example, refraction and reflection of light may occur in an order of the first lens 110, the third lens 130, the second lens 120, the third lens 130, and the fourth lens 140. In the description below, shapes of the lenses will be described with reference to the order of refraction and reflection of light.

The first lens 110 may have positive refractive power, and may have a convex object-side surface and a concave image-side surface. The first lens 110 configured as above may refract light to the third lens 130.

The third lens 130 may have a concave object-side surface and a convex image-side surface. The third lens 130 may be configured to reflect and refract light. For example, a paraxial region of the third lens 130 may be configured to refract light, and an edge region other than a paraxial region of the third lens 130 may be configured to reflect light. A reflective region 1342 may be formed on an image-side surface 134 of the third lens 130. More specifically, the reflective region 1342 may be formed on an edge region of the image-side surface 134 of the third lens 130. The reflective region 1342 may be formed by applying a reflective material on the image-side surface of the third lens 130. The other region of the image-side surface of the third lens 130 may form a refractive region 1344 in which light is refracted.

The second lens 120 may have a concave object-side surface and a convex image-side surface. An object-side surface 122 of the second lens 120 may form a reflective region. In the embodiment, an overall area of the object-side surface 122 of the second lens 120 may be a reflective region. An overall area of an image-side surface 124 of the second lens 120 may be configured to refract light. The second lens 120 configured as above may be configured to reflect light reflected from an edge region of the third lens 130 to a paraxial region of the third lens 130. The light incident to the third lens 130 may be refracted in a paraxial region of the third lens 130 and may be incident to the fourth lens 140. More specifically, the light reflected from the reflective region 1342 of the third lens 130 may be refracted by sequentially passing through an object-side surface 132 of the third lens 130 and the image-side surface 124 of the second lens 120, and may be reflected at the object-side surface 122 of the second lens 120. The light reflected from the object-side surface of the second lens 120 may be refracted by passing through the image-side surface 124 of the second lens 120, the object-side surface 132 of the third lens 130, and the paraxial region 1344 of the image-side surface 134 of the third lens 130, and may be incident to the fourth lens 140.

The fourth lens 140 may have negative refractive power. The fourth lens 140 may have a concave object-side surface and a convex image-side surface. The fourth lens 140 configured as above may allow light refracted in the paraxial region of the third lens 130 to be incident to the imaging plane.

The optical imaging system 100 may further include a stop ST. For example, the stop ST may be disposed on a front region of the first lens 110.

The optical imaging system 100 may further include a filter 150. For example, the filter 150 may be disposed between the fourth lens 140 and the image sensor 160, and may prevent infrared light from being incident to an imaging plane of the image sensor 160.

In an example of the optical imaging system configured as above a focal length f may be 15.00 mm, an F No. may be 2.770, a total lens length TL1 may be 5.85 mm, and a total optical length TL2 may be 11.83 mm.

Figure 2:
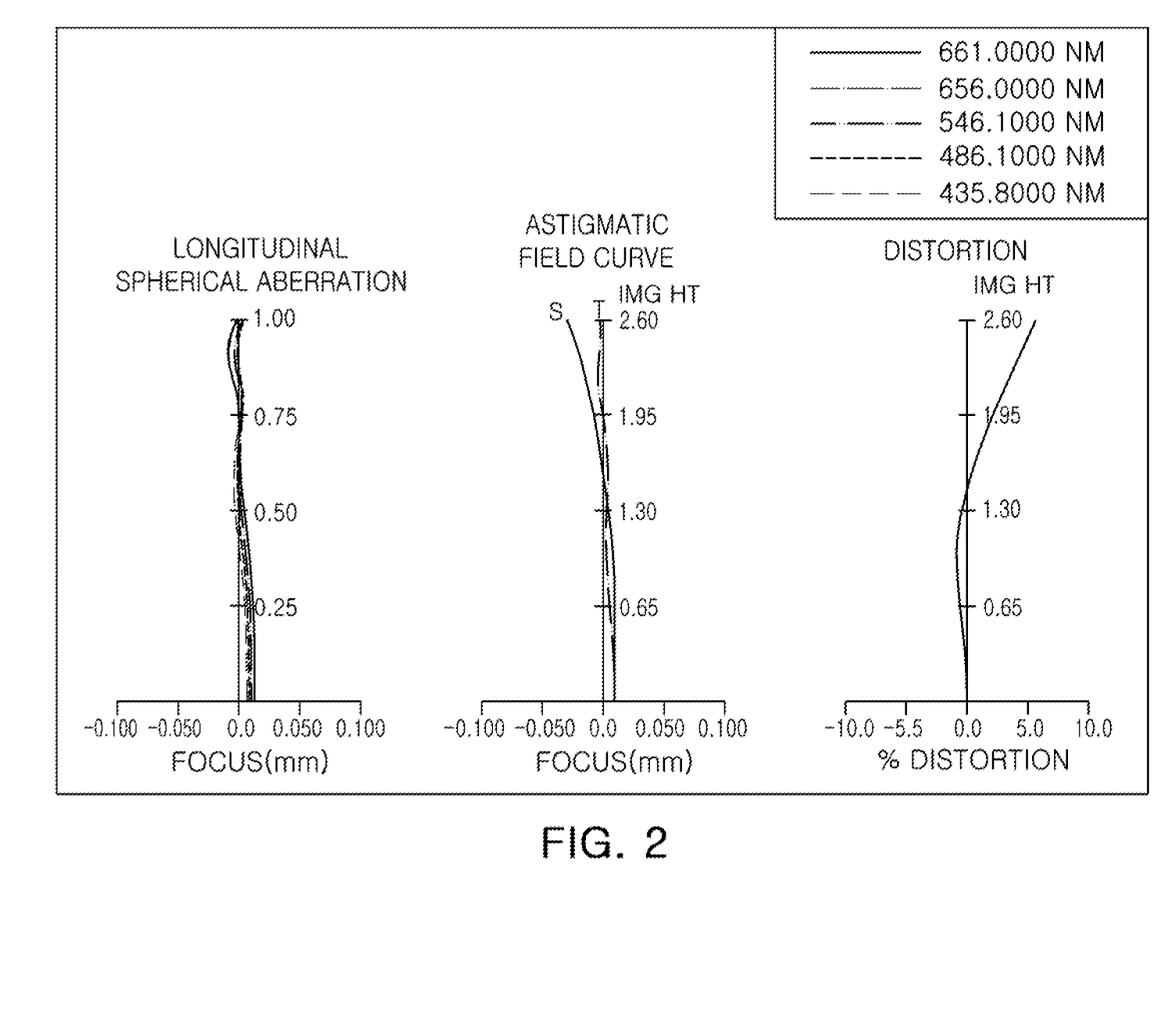
FIG. 2 is aberration curves of an optical imaging system illustrated in FIG. 1.

The optical imaging system in the embodiment may have aberration characteristics as illustrated in FIG. 2. Table 1 below lists characteristics of the lenses included in the optical imaging system in the embodiment.

TABLE 1

| Surface No. | Radius of Curvature | Thickness/ Distance | Refractive Index (nd) | Abbe No. (vd) | Refractive Mode |
|---|---|---|---|---|---|
| Object | infinity | infinity | | | Refract |
| 1* (Stop) | 4.86965 | 0.46529 | 1.5441 | 56 | Refract |
| 2* | 6.20000 | 3.00000 | | | Refract |
| 3* | −9.14491 | 0.50000 | 1.66 | 20.4 | Refract |
| 4* | −9.42633 | −0.50000 | 1.66 | 20.4 | Reflect |
| 5* | −9.14491 | −2.18000 | | | Refract |
| 6* | 41.67012 | −0.30002 | 1.5441 | 56 | Refract |
| 7* | −6.32000 | 0.30002 | 1.5441 | 56 | Reflect |
| 8* | 41.67012 | 2.18000 | | | Refract |
| 9* | −9.14000 | 0.50000 | 1.66 | 20.4 | Refract |
| 10* | −9.42633 | 0.60000 | | | Refract |
| 11* | −7.45485 | 0.38471 | 1.66 | 20.4 | Refract |
| 12* | −8.66638 | 0.10000 | | | Refract |
| 13 | infinity | 0.21000 | 1.516 | 64.1 | Refract |
| 14 | infinity | 0.50006 | | | Refract |
| Imaging Plane | infinity | −0.01000 | | | Refract |

("*" indicates that a respective surface is aspherical)

Surface No. in the table above indicates an order of refraction and reflection of light incident to the optical imaging system. For example, surface No. 1 refers to an object-side surface 112 of the first lens, surface No. 2 refers to an image-side surface 114 of the first lens, surface Nos. 3, 5, and 9 refer to an object-side surface 132 of the third lens, surface No. 4 refers to an edge region 1342 of an image-side surface of the third lens, surface No. 10 refers to a paraxial region 1344 of an image-side surface of the third lens, surface Nos. 6 and 8 refer to an image-side surface 124 of the second lens, and surface No. 7 refers to an object-side surface 122 of the second lens. Surface No. 11 refers to an object-side surface 142 of the fourth lens, and surface No. 12 refers to an image-side surface 144 of the fourth lens.

Table 2 lists aspherical characteristics of the optical imaging system.

TABLE 2

| Surface No. | K | A | B | C | D | E | F | G |
|---|---|---|---|---|---|---|---|---|
| 1 | 0 | −1.21E−03 | −1.78E−04 | −6.11E−05 | 1.36E−06 | 0 | 0 | 0 |
| 2 | 0 | −2.78E−04 | −1.69E−04 | −7.39E−05 | 3.24E−06 | 0 | 0 | 0 |
| 3 | 0 | 9.26E−05 | −2.37E−05 | −1.17E−06 | 9.45E−08 | 0 | 0 | 0 |
| 4 | 0 | −1.64E−04 | −1.11E−05 | 0 | 0 | 0 | 0 | 0 |
| 5 | 0 | 9.26E−05 | −2.37E−05 | −1.17E−06 | 9.45E−08 | 0 | 0 | 0 |
| 6 | 0 | 3.91E−03 | −2.23E−03 | 3.73E−04 | −2.77E−06 | 0 | 0 | 0 |
| 7 | 0 | −2.92E−03 | −1.46E−03 | 0 | 0 | 0 | 0 | 0 |
| 8 | 0 | 3.91E−03 | −2.23E−03 | 3.73E−04 | −2.77E−06 | 0 | 0 | 0 |
| 9 | 0 | 9.26E−05 | −2.37E−05 | −1.17E−06 | 9.45E−08 | 0 | 0 | 0 |
| 10 | 0 | −1.64E−04 | −1.11E−05 | 0 | 0 | 0 | 0 | 0 |
| 11 | 0 | −4.50E−02 | 1.52E−02 | −2.50E−03 | 1.61E−04 | 1.65E−05 | −2.20E−06 | 0 |
| 12 | 0 | −7.03E−02 | 2.50E−02 | −4.56E−03 | 3.82E−04 | 4.02E−06 | −1.76E−06 | 0 |

Figure 3:
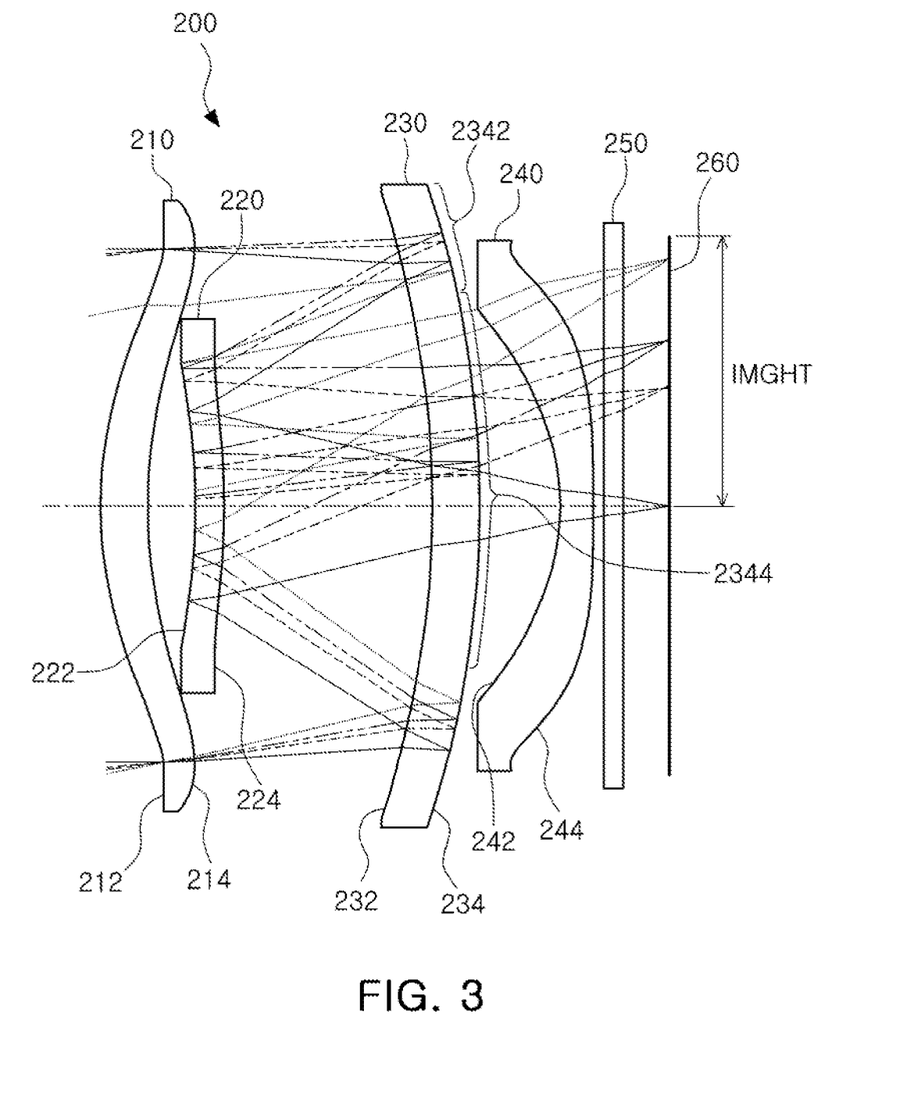
FIG. 3 is a diagram illustrating second example of an optical imaging system.

In the description below, a second example of an optical imaging system will be described with reference to FIG. 3.

An optical imaging system 200 may include a plurality of lenses having refractive power. For example, the optical imaging system 200 may include a first lens 210, a second lens 220, a third lens 230, and a fourth lens 240. The first to fourth lenses 210, 220, 230, and 240 may be disposed in order with gaps from an object-side surface. However, refraction and reflection of light may not occur in the order of the first lens 210, the second lens 220, the third lens 230, and the fourth lens 240. For example, refraction and reflection of light may occur in an order of the first lens 210, the third lens 230, the second lens 220, the third lens 230, and the fourth lens 240. In the description below, shapes of the lenses will be described with reference to the order of refraction and reflection of light.

The first lens 210 may have positive refractive power, and may have a convex object-side surface and a concave image-side surface. The first lens 210 configured as above may refract light to the third lens 230.

The third lens 230 may have a concave object-side surface and a convex image-side surface. The third lens 230 may be configured to reflect and refract light. For example, a paraxial region of the third lens 230 may be configured to refract light, and an edge region other than the paraxial region of the third lens 230 may be configured to reflect light. A reflective region 2342 may be formed on an image-side surface 234 of the third lens 230. More specifically, the reflective region 2342 may be formed on an edge region of the image-side surface 234 of the third lens 230. The reflective region 2342 may be formed by applying a reflective material to the image-side surface of the third lens 230. The other region of the image-side surface of the third lens 230 may form a refractive region 2344 in which light is refracted.

The second lens 220 may have a concave object-side surface and a convex image-side surface. An object-side surface 222 of the second lens 220 may form a reflective region. In the embodiment, an overall area of the object-side surface 222 of the second lens 220 may be a reflective region. An overall area of an image-side surface 224 of the second lens 220 may be configured to refract light. The second lens 220 configured as above may be configured to reflect light reflected from an edge region of the third lens 230 to a paraxial region of the third lens 230. The light incident to the third lens 230 may be refracted in the paraxial region of the third lens 230 and may be incident to the fourth lens 240. More specifically, the light reflected from the reflective region 2342 of the third lens 230 may be refracted by sequentially passing through an object-side surface 232 of the third lens 230 and the image-side surface 224 of the second lens 220, and may be reflected at the object-side surface 222 of the second lens 220. The light reflected from the object-side surface of the second lens 220 may be refracted by passing through the image-side surface 224 of the second lens 220, the object-side surface 232 of the third lens 230, and the paraxial region 2344 of the image-side surface 234 of the third lens 230 and may be incident to the fourth lens.

The fourth lens 240 may have negative refractive power. The fourth lens 240 may have a concave object-side surface and a convex image-side surface. The fourth lens 240 configured as above may allow light refracted from the paraxial region of the third lens 230 to be incident to the imaging plane.

The optical imaging system 200 may include a stop ST. For example, the stop ST may be disposed on a front region of the first lens 210.

The optical imaging system 200 may include a filter 250. For example, the filter 250 may be disposed between the fourth lens 240 and the image sensor 260, and may prevent infrared light from being incident to an imaging plane of the image sensor 260.

In an example of the optical imaging system configured as above a focal length f may be 15.00 mm, an F No. may be 2.770, a total lens length TL1 may be 6.00 mm, and a total optical length TL2 may be 12.02 mm.

Figure 4:
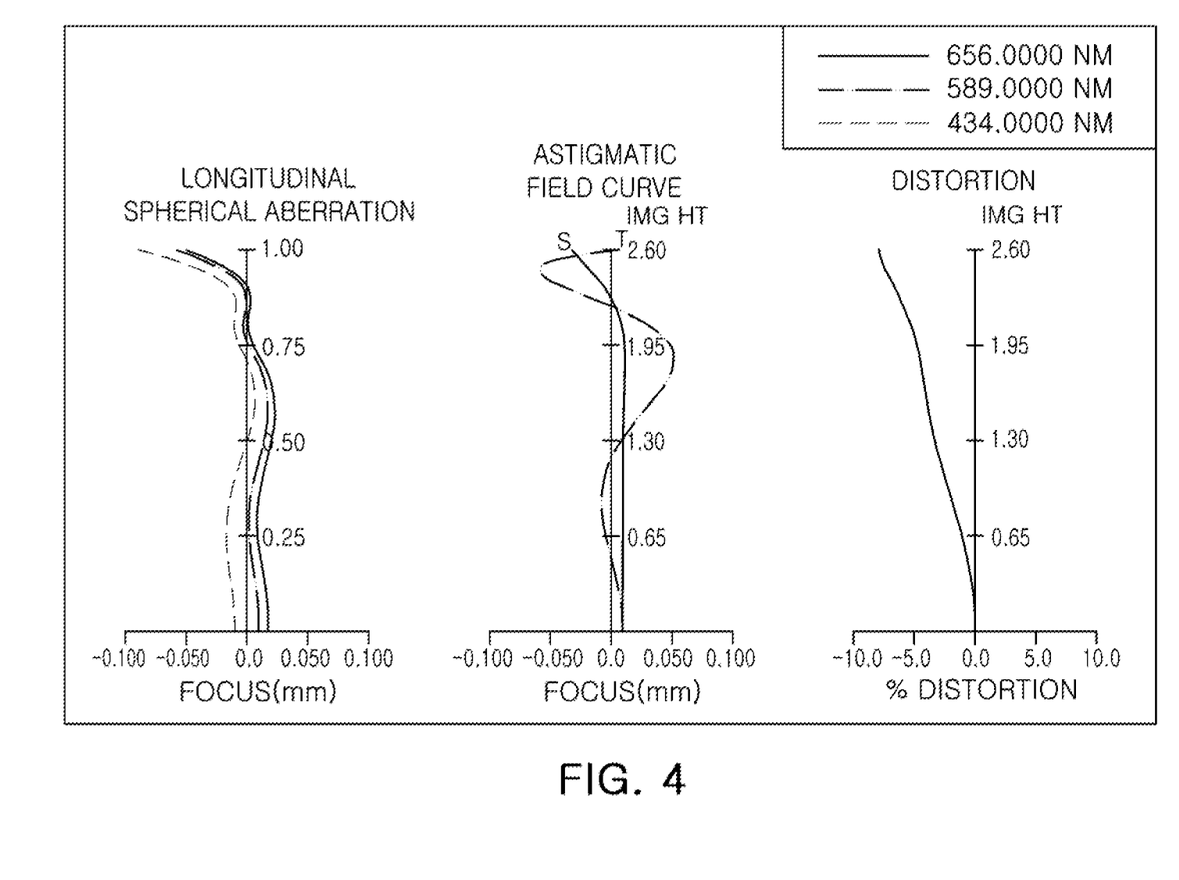
FIG. 4 is aberration curves of an optical imaging system illustrated in FIG. 3.

The optical imaging system in the embodiment may have aberration characteristics as illustrated in FIG. 4. Table 3 below lists characteristics of the lenses included in the optical imaging system in the embodiment.

TABLE 3

| Surface No. | Radius of Curvature | Thickness/ Distance | Refractive Index (nd) | Abbe No. (vd) | Refractive Mode |
|---|---|---|---|---|---|
| Object | infinity | infinity | | | Refract |
| 1* (Stop) | 4.30038 | 0.50000 | 1.5441 | 56 | Refract |
| 2* | 5.27662 | 3.00000 | | | Refract |
| 3* | −9.80577 | 0.50000 | 1.66 | 20.4 | Refract |
| 4 | −10.66062 | −0.50000 | 1.66 | 20.4 | Reflect |
| 5* | −9.80577 | −2.20000 | | | Refract |
| 6* | −7.06348 | −0.30002 | 1.5441 | 56 | Refract |
| 7* | −6.68220 | 0.30002 | 1.5441 | 56 | Reflect |
| 8* | −7.06348 | 2.20000 | | | Refract |
| 9* | −9.81000 | 0.50000 | 1.66 | 20.4 | Refract |
| 10 | −10.66062 | 0.85000 | | | Refract |
| 11* | −2.25973 | 0.35000 | 1.5441 | 56 | Reflect |

TABLE 3-continued

| Surface No. | Radius of Curvature | Thickness/ Distance | Refractive Index (nd) | Abbe No. (vd) | Refractive Mode |
|---|---|---|---|---|---|
| 12* | −61.56399 | 0.10001 | | | Refract |
| 13 | infinity | 0.21000 | 1.516 | 64.1 | Refract |
| 14 | infinity | 0.49999 | | | Reflect |
| Imaging Plane | infinity | −0.01000 | | | Refract |

("*" indicates that a respective surface is aspherical)

Surface No. in the table above indicates an order of refraction and reflection of light incident to the optical imaging system. For example, surface No. 1 refers to an object-side surface 212 of the first lens, surface No. 2 refers to an image-side surface 214 of the first lens, surface Nos. 3, 5, and 9 refer to an object-side surface 232 of the third lens, surface No. 4 refers to an edge region 2342 of an image-side surface of the third lens, surface No. 10 refers to a paraxial region 2344 of an image-side surface of the third lens, surface Nos. 6 and 8 refer to an image-side surface 224 of the second lens, and surface No. 7 refers to an object-side surface 222 of the second lens. Surface No. 11 refers to an object-side surface 242 of the fourth lens, and surface No. 12 refers to an image-side surface 244 of the fourth lens.

Table 4 lists aspherical characteristics of the optical imaging system.

TABLE 4

| Surface No. | K | A | B | C | D | E | F | G |
|---|---|---|---|---|---|---|---|---|
| 1 | 0 | −1.99E−03 | −2.63E−04 | −1.24E−05 | −2.23E−06 | 0 | 0 | 0 |
| 2 | 0 | −1.62E−03 | −2.02E−04 | −3.14E−05 | −1.96E−07 | 0 | 0 | 0 |
| 3 | 0 | 1.50E−04 | 1.22E−05 | 0 | 0 | 0 | 0 | 0 |
| 4 | 0 | 0 | 0 | 0 | 0 | 0 | 0 | 0 |
| 5 | 0 | 1.50E−04 | 1.22E−05 | 0 | 0 | 0 | 0 | 0 |
| 6 | 0 | 1.09E−02 | 8.85E−04 | 1.68E−04 | −4.57E−05 | 0 | 0 | 0 |
| 7 | 0 | 2.70E−03 | 4.00E−04 | 0 | 0 | 0 | 0 | 0 |
| 8 | 0 | 1.09E−02 | 8.85E−04 | 1.68E−04 | −4.57E−05 | 0 | 0 | 0 |
| 9 | 0 | 1.50E−04 | 1.22E−05 | 0 | 0 | 0 | 0 | 0 |
| 10 | 0 | 0 | 0 | 0 | 0 | 0 | 0 | 0 |
| 11 | 0 | 2.47E−02 | −1.64E−04 | −1.01E−03 | 2.56E−04 | 0 | 0 | 0 |
| 12 | 0 | −3.64E−02 | 1.05E−02 | −2.23E−03 | 1.62E−04 | 0 | 0 | 0 |

Figure 5:
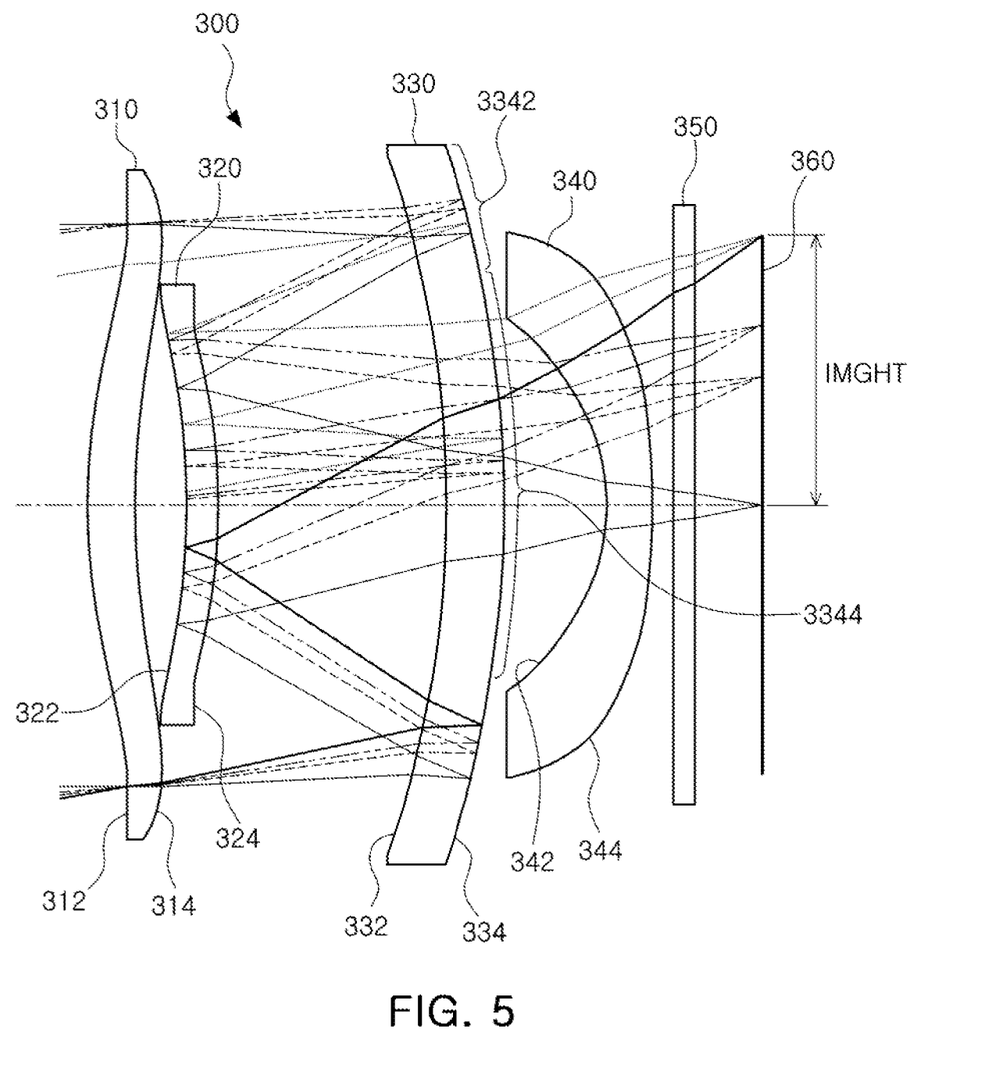
FIG. 5 is a diagram illustrating a third example of an optical imaging system.

In the description below, a third example of an optical imaging system will be described.

An optical imaging system 300 may include a plurality of lenses having refractive power. For example, the optical imaging system 300 may include a first lens 310, a second lens 320, a third lens 330, and a fourth lens 340. The first to fourth lenses 310, 320, 330, and 340 may be disposed in order with gaps from an object-side surface. Refraction and reflection of light, however, may not occur in the order of the first lens 310, the second lens 320, the third lens 330, and the fourth lens 340. For example, refraction and reflection of light may occur in an order of the first lens 310, the third lens 330, the second lens 320, the third lens 330, and the fourth lens 340. In the description below, shapes of the lenses will be described with reference to the order of refraction and reflection of light.

The first lens 310 may have positive refractive power, and may have a convex object-side surface and a concave image-side surface. The first lens 310 configured as above may refract light to the third lens 330.

The third lens 330 may have a concave object-side surface and a convex image-side surface. The third lens 330 may be configured to reflect and refract light. For example, a paraxial region of the third lens 330 may be configured to refract light, and an edge region other than a paraxial region of the third lens 330 may be configured to reflect light. A reflective region 3342 may be formed on an image-side surface 334 of the third lens 330. More specifically, the reflective region 3342 may be formed on an edge region of the image-side surface 334 of the third lens 330. The reflective region 3342 may be formed by applying a reflective material on the image-side surface of the third lens 330. The other region of the image-side surface of the third lens 330 may form a refractive region 3344 in which light is refracted.

The second lens 320 may have a concave object-side surface and a convex image-side surface. An object-side surface 322 of the second lens 320 may form a reflective region. In the embodiment, an overall area of the object-side surface 322 of the second lens 320 may be a reflective region. An overall area of an image-side surface 324 of the second lens 320 may be configured to refract light. The second lens 320 configured as above may be configured to reflect light reflected from an edge region of the third lens 330 to a paraxial region of the third lens 330. The light incident to the third lens 330 may be refracted in a paraxial region of the third lens 330 and may be incident to the fourth lens 340. More specifically, the light reflected from the reflective region 3342 of the third lens 330 may be refracted by sequentially passing through an object-side surface 332 of the third lens 330 and the image-side surface 324 of the second lens 320, and may be reflected at the object-side surface 322 of the second lens 320. The light reflected from the object-side surface of the second lens 320 may be refracted by passing through the image-side surface 324 of the second lens 320, the object-side surface 332 of the third lens 330, and the paraxial region 3344 of the image-side surface 334 of the third lens 330, and may be incident to the fourth lens 340.

The fourth lens 340 may have negative refractive power. The fourth lens 340 may have a concave object-side surface and a convex image-side surface. The fourth lens 340 configured as above may allow light refracted from the paraxial region of the third lens 330 to be incident to the imaging plane.

The optical imaging system 300 may include a stop ST. For example, the stop ST may be disposed on a front region of the first lens 310.

The optical imaging system 300 may include a filter 350. For example, the filter 350 may be disposed between the fourth lens 340 and the image sensor 360, and may prevent infrared light from being incident to an imaging plane of the image sensor 360.

In an example of the optical imaging system configured as above a focal length f may be 15.00 mm, an F No. may be 2.770, a total lens length TL1 may be 6.50 mm, and a total optical length TL2 may be 12.60 mm.

Figure 6:
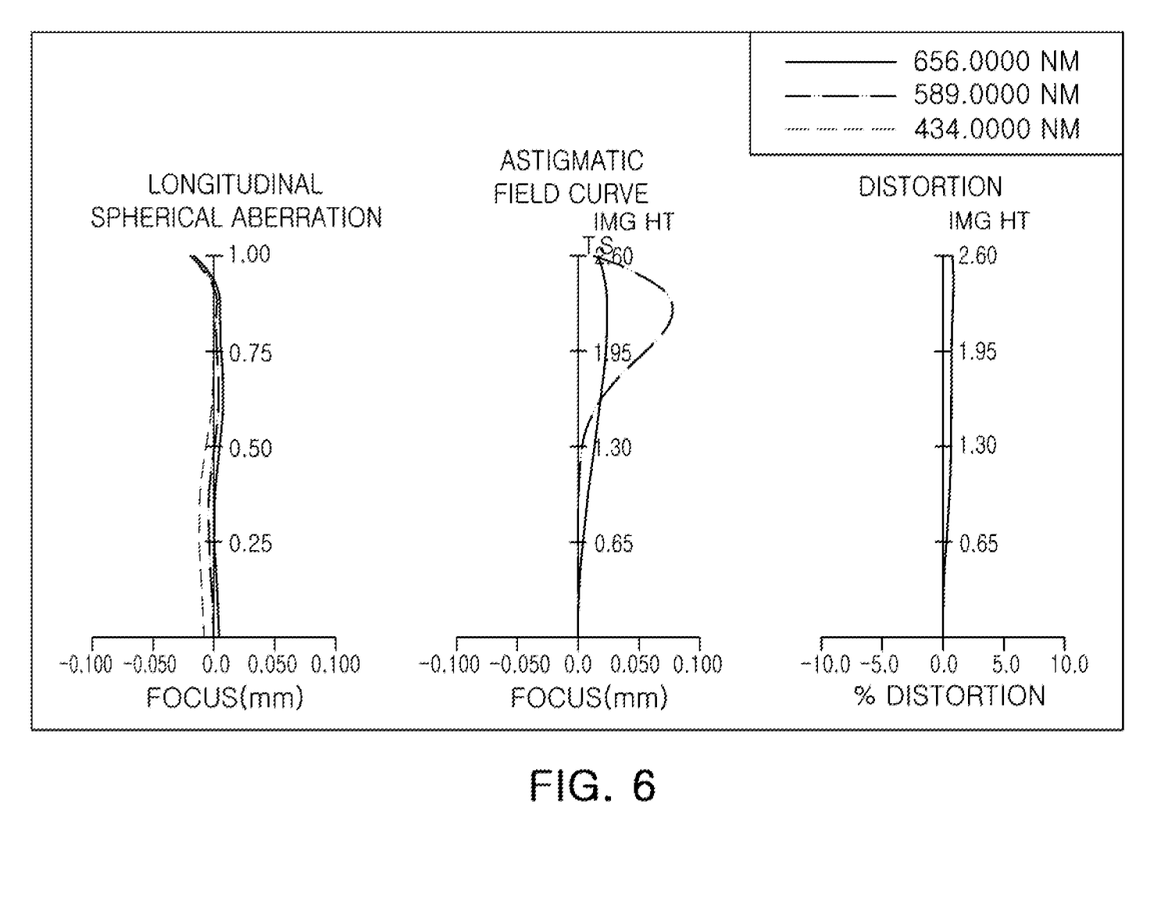
FIG. 6 is aberration curves of an optical imaging system illustrated in FIG. 5.

The optical imaging system in the embodiment may have aberration characteristics as illustrated in FIG. 6. Table 5 below lists characteristics of lenses included in the optical imaging system in the embodiment.

TABLE 5

| Surface No. | Radius of Curvature | Thickness/ Distance | Refractive Index (nd) | Abbe No. (vd) | Refractive Mode |
|---|---|---|---|---|---|
| Object | infinity | infinity | | | Refract |
| 1* (Stop) | 5.97784 | 0.45525 | 1.5441 | 56 | Refract |
| 2* | 7.52407 | 3.00000 | | | Refract |
| 3 | −10.31551 | 0.55000 | 1.66 | 20.4 | Refract |
| 4 | −11.11483 | −0.55000 | 1.66 | 20.4 | Reflect |
| 5 | −10.31551 | −2.20000 | | | Refract |
| 6* | −6.74077 | −0.30002 | 1.5441 | 56 | Refract |
| 7* | −7.50337 | 0.30002 | 1.5441 | 56 | Reflect |
| 8* | −6.74077 | 2.20000 | | | Refract |
| 9 | −10.30000 | 0.55000 | 1.66 | 20.4 | Refract |
| 10 | −11.11483 | 1.00000 | | | Refract |
| 11* | −1.95722 | 0.43336 | 1.5441 | 56 | Refract |
| 12* | −7.63615 | 0.20001 | | | Refract |
| 13 | infinity | 0.21000 | 1.516 | 64.1 | Refract |
| 14 | infinity | 0.65082 | | | Refract |
| Imaging Plane | infinity | 0.00056 | | | Refract |

("*" indicates that a respective surface is aspherical)

Surface No. in the table above indicates an order of refraction and reflection of light incident to the optical imaging system. For example, surface No. 1 refers to an object-side surface 312 of the first lens, surface No. 2 refers to an image-side surface 314 of the first lens, surface Nos. 3, 5, and 9 refer to an object-side surface 332 of the third lens, surface No. 4 refers to an edge region 3342 of an image-side surface of the third lens, surface No. 10 refers to a paraxial region 3344 of an image-side surface of the third lens, surface Nos. 6 and 8 refer to an image-side surface 324 of the second lens, and surface No. 7 refers to an object-side surface 322 of the second lens. Surface No. 11 refers to an object-side surface 342 of the fourth lens, and surface No. 12 refers to an image-side surface 344 of the fourth lens.

Table 6 lists aspherical characteristics of the optical imaging system.

TABLE 6

| Surface No. | K | A | B | C | D | E | F | G |
|---|---|---|---|---|---|---|---|---|
| 1 | 0 | −2.70E−03 | −2.47E−04 | 5.50E−07 | −1.10E−06 | 0 | 0 | 0 |
| 2 | 0 | −2.64E−03 | −2.27E−04 | −3.23E−06 | −5.54E−07 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | −1.13E−02 | 3.49E−03 | 0 | 0 | 0 | 0 | 0 |
| 7 | 0 | −4.83E−03 | 1.59E−03 | 0 | 0 | 0 | 0 | 0 |
| 8 | 0 | −1.13E−02 | 3.49E−03 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 2.11E−02 | −8.77E−03 | 2.31E−03 | 1.15E−04 | 0 | 0 | 0 |
| 12 | 0 | 5.51E−03 | −1.11E−02 | 2.82E−03 | −2.49E−04 | 0 | 0 | 0 |

Table 7 indicates values of the conditional expressions in the first, second, and third examples of an optical imaging system. As indicated in Table 7, the first to third examples of an optical imaging system may satisfy all numerical ranges of the conditional expressions set forth above.

TABLE 7

| Conditional Expressions | First Example | Second Example | Third Example |
|---|---|---|---|
| L1S1/f | 0.3246 | 0.2867 | 0.3985 |
| L2S1/f | −0.4213 | −0.4455 | −0.5002 |
| L3S1/f | −0.6097 | −0.6537 | −0.6877 |
| L3S2/f | −0.6284 | −0.7107 | −0.7410 |
| TL2/TL1 | 2.0222 | 2.0033 | 1.9385 |
| f/TL1 | 2.5641 | 2.5000 | 2.3077 |
| f/TL2 | 1.2680 | 1.2479 | 1.1905 |

According to the aforementioned embodiments, the optical imaging system appropriate for a small-sized camera having high performance may be implemented.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
    a first lens having refractive power;
    a second lens comprising a first reflective region formed on an object-side surface of the second lens, wherein an absolute value of a radius of curvature of the object-side surface of the second lens is greater than an absolute value of a radius of curvature of an image-side surface of the first lens;

a third lens comprising a second reflective region formed on an image-side surface of the third lens;

a fourth lens having refractive power, wherein the optical imaging system comprises no more than four lenses, wherein the first lens, the second lens, the third lens, and the fourth lens are sequentially disposed in an order from an object side to an image side along an optical axis, wherein TL2/TL1<2.1, where TL1 is a total lens length (a distance from an object-side surface of the first lens to an imaging plane) of the optical imaging system, and TL2 is a total optical length (a sum of lengths of light refracted and reflected between the object-side surface of the first lens and the imaging plane) of the optical imaging system, and wherein the imaging plane is disposed on an image side of the first lens.

2. The optical imaging system of claim 1, wherein the first reflective region is disposed to include an optical axis of the second lens.

3. The optical imaging system of claim 1, wherein the second reflective region is formed on a region other than an optical axis of the third lens.

4. The optical imaging system of claim 3, wherein the second reflective region surrounds the optical axis and is spaced apart from the optical axis by a refractive region formed on the image-side surface of the third lens, and wherein the refractive region includes the optical axis of the third lens.

5. The optical imaging system of claim 1, wherein the first lens comprises a convex object-side surface.

6. The optical imaging system of claim 1, wherein the second lens comprises a convex image-side surface.

7. The optical imaging system of claim 1, wherein the third lens comprises a concave object-side surface.

8. The optical imaging system of claim 1, wherein the third lens comprises a convex image-side surface.

9. The optical imaging system of claim 1, wherein the fourth lens comprises a convex image-side surface.

10. The optical imaging system of claim 1, wherein the second lens comprises an effective diameter smaller than effective diameters of the first lens and the third lens.

11. An optical imaging system, comprising:

a first lens, a second lens, a third lens, and a fourth lens disposed in order from an object-side along an optical axis, wherein one or more of the first to fourth lenses comprise a reflective region reflecting light refracted from adjacent lenses, wherein the optical imaging system satisfies a conditional expression:

$1.1 \leq f/TL2$, where f is a focal length of the optical imaging system, and TL2 is a total optical length (a sum of lengths of light refracted and reflected between an object-side surface of the first lens and an imaging plane) of the optical imaging system, wherein the optical imaging system comprises no more than four lenses, wherein the imaging plane is disposed on an image side of the first lens, and wherein the second lens comprises a reflective region formed on an object-side surface of the second lens, and an absolute value of a radius of curvature of the object-side surface of the second lens is greater than an absolute value of a radius of curvature of an image-side surface of the first lens.

12. The optical imaging system of claim 11, wherein the third lens comprises a reflective region formed on an image-side surface of the third lens.

13. The optical imaging system of claim 11, wherein the first lens comprises a convex object-side surface.

14. The optical imaging system of claim 11, wherein the optical imaging system satisfies a conditional expression:

$TL2/TL1 < 2.1$ where TL1 is a total lens length (a distance from the object-side surface of the first lens to the imaging plane) of the optical imaging system.

15. The optical imaging system of claim 11, wherein the optical imaging system satisfies one or more conditional expressions:

$0.1 < L1S1/f < 0.95$ $-0.95 < L2S1/f < -0.1$ $-1.5 < L3S1/f < -0.2$ $-1.55 < L3S2/f < -0.25$ where L1S1 is a radius of curvature of an object-side surface of the first lens, L2S1 is a radius of curvature of an object-side surface of the second lens, L3S1 is a radius of curvature of an object-side surface of the third lens, and L3S2 is a radius of curvature of an image-side surface of the third lens.

16. An optical imaging system, comprising:

a first lens, a second lens, a third lens, and a fourth lens disposed adjacent one another in order from an object-side, wherein the fourth lens is disposed along an optical axis adjacent an imaging plane of the optical imaging system, wherein incident light from the object-side is refracted by the first lens, reflected by a reflective region of the third lens, reflected by a reflective surface of the second lens, refracted by a refractive region of the third lens, and refracted by the fourth lens to form an image in this order, wherein the optical imaging system comprises no more than four lenses, and wherein TL2/TL1<2.1, where TL1 is a total lens length (a distance from an object-side surface of the first lens to the imaging plane) of the optical imaging system, and TL2 is a total optical length (a sum of lengths of light refracted and reflected between the object-side surface of the first lens and the imaging plane) of the optical imaging system, wherein the imaging plane is disposed on an image side of the first lens, and wherein a reflective region of the second lens is disposed on an object-side surface of the second lens, and an absolute value of a radius of curvature of the object-side surface of the second lens is greater than an absolute value of a radius of curvature of an image-side surface of the first lens.

17. The optical imaging system of claim 16, wherein the reflective region of the third lens is disposed on an image-side surface of the third lens and spaced apart from an optical axis of the third lens.

18. The optical imaging system of claim 17, wherein the refractive region of the third lens includes the optical axis on the image-side surface of the third lens.

19. The optical imaging system of claim 16, wherein the reflective region of the second lens is disposed on an object-side surface of the second lens and includes an optical axis of the second lens.

20. The optical imaging system of claim 1, wherein each of the first lens, the second lens, the third lens, and the fourth lens comprises at least one aspherical surface.

21. The optical imaging system of claim 1, wherein an absolute value of a radius of curvature of the image-side surface of the second lens is greater than an absolute value of a radius of curvature of the object-side surface of the second lens.

* * * * *